United States Patent [19]

Steckler

[11] 3,875,202

[45] Apr. 1, 1975

[54] SULFATES OF MONOETHYLENICALLY UNSATURATED ALCOHOLS AND THE ALKENOXYLATED ADDUCTS OF SAID ALCOHOLS

[75] Inventor: Robert Steckler, Crofton, Md.

[73] Assignee: Alcolac Inc., Baltimore, Md.

[22] Filed: Jan. 5, 1973

[21] Appl. No.: 321,228

[52] U.S. Cl.......... 260/458, 260/79.3 M, 260/80.71, 260/80.73, 260/85.7, 260/87.1, 260/87.5 R, 260/87.5 G, 260/457, 260/484 R, 260/611 A, 260/615 B, 260/964, 260/965
[51] Int. Cl........................................... C07c 141/10
[58] Field of Search..................................... 260/458

[56] References Cited
UNITED STATES PATENTS

| | | | |
|---|---|---|---|
| 2,199,403 | 5/1940 | Henke et al. | 260/458 |
| 2,241,421 | 5/1941 | Price et al. | 260/458 |
| 2,677,700 | 5/1954 | Jackson et al. | 260/458 |
| 3,413,331 | 11/1968 | Beiser et al. | 260/458 |
| 3,778,479 | 12/1973 | Morrisroe et al. | 260/458 |

Primary Examiner—Bernard Helfin
Assistant Examiner—Norman Morgenstein
Attorney, Agent, or Firm—Henry B. Kellog; George L. Tone

[57] ABSTRACT

Monoethylenically unsaturated alcohols of from 3 to 12 carbon atoms or the alkenoxylated adducts of such alcohols are reacted with a sulfating agent, such as, for example, sulfamic acid in the presence of an organic amide, i.e., urea, etc., as a catalyst at a temperature of about 85° to about 125°C. for a period of time sufficient to give a high degree of conversion as determined by the acid number of the reaction mixture. The resulting monomers, which are useful as co-monomers in emulsion polymerizations, as comonomers for the preparation of membranes and polyelectrolyte complexes, and as co-monomers which function as dye acceptors in the preparation of polymers from acrylonitrile, vinyl chloride, etc., for use as films and fibers, are characterized by the following formula:

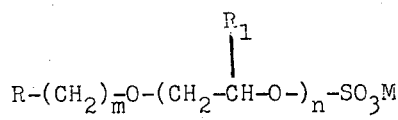

wherein R is a radical selected from the group consisting of vinyl, allyl, propenyl, isopropenyl and styryl, $R_1$ is either hydrogen, methyl or ethyl, $m$ is a numeral of from 1 to 10, $n$ is either zero or a numeral of from 1 to 100, and M is either ammonium or an alkali metal, e.g. sodium, potassium or lithium.

7 Claims, No Drawings

SULFATES OF MONOETHYLENICALLY UNSATURATED ALCOHOLS AND THE ALKENOXYLATED ADDUCTS OF SAID ALCOHOLS

This invention relates to a new class of polymerizable ammonium and alkali metal salts of sulfated monoethylenically unsaturated alcohols of from 3 to 12 carbon atoms and of the alkenoxylated adducts of such alcohols.

The principal object of the present invention is to provide a new class of polymerizable monomers.

Other objects and advantages will become manifest from the following description.

It is known that polymerizable sulfo esters of alpha-methylene carboxylic acids can be prepared by reacting an alpha-methylene carboxylic acid chloride such as acryloyl or methacryloyl chloride with an alkali metal salt of a hydroxy alkane sulfonic acid such as, for example, sodium isethionate while dispersed in an inert diluent at elevated temperature. The monomers thus prepared are sulfonates and not sulfates. The economic shortcoming in this preparation is the high cost of the alpha-methylene carboxylic acid chlorides as well as their toxic effect on human skin and mucous membrane.

I have found that polymerizable monomers of ammonium and alkali metal salts of monoethylenically unsaturated alcohols of from 3 to 12 carbon atoms and of the alkenoxylated adducts of such alcohols having the formula:

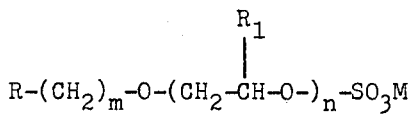

$$R-(CH_2)_m-O-(CH_2-CH-O-)_n-SO_3M$$
with $R_1$ on the CH.

wherein R is a monoethylenically unsaturated radical selected from the group consisting of vinyl $CH_2=CH-$, allyl $CH_2=CH-CH_2-$, propenyl $CH_3-CH=CH-$, isopropenyl $CH_2=C(CH_3)-$, and styryl $C_6H_5-CH=CH-$; $R_1$ is either hydrogen, methyl or ethyl; $m$ is a numeral of from 1 to 10; $n$ is either zero or a numeral of from 1 to 100 and M is either ammonium or an alkali metal, e.g., lithium, potassium or sodium, are prepared by reacting one mole of a monoethylenically unsaturated alcohol of from 3 to 12 carbon atoms or one mole of the alkenoxylated adduct of such alcohol with one mole in slight excess to about 2 moles of a sulfating agent such as, for example, sulfamic acid in the presence of an organic amide as a catalyst such as, for example, urea, acetamide, dicyandiamide, and the like, at a temperature ranging from about 85°C. to about 125°C., for a period of time sufficient to give a conversion of at least 80% preferably between 90 and 100% as determined by the acid number of the reaction mixture. The actual time may range from about 2½ to 4 hours.

The amount of catalyst that may be employed is variable and may range from about 0.01% to about 1% by weight based on the weight of the unsaturated alcohol or the alkenoxylated adduct of such alcohol.

Instead of sulfamic acid as the sulfating agent, chlorosulfonic acid, $SO_3$ or oleum may be employed in the conventional manner.

As examples of the monoethylenically unsaturated alcohols employed in accordance with the present invention the following are illustrative: allyl alcohol, allyl carbinol, beta-allyl-ethyl alcohol, crotyl alcohol (2-buten-1-ol), methallyl alcohol, hexen-1-ol-6, hepten-1-ol-7, octen-1-ol-8, decen-1-ol-10, undecylene alcohol (undecen-1-ol-11), dodecen-1-ol-12, tetradecen-1-ol-14, cinnamyl alcohol, and the like. In addition to the latter alcohols, methyl-vinyl-carbinol, vinyl-ethyl-carbinol and methyl allyl-carbinol may also be employed.

As noted above, the foregoing alcohols may be sulfated or the alcohols may be alkenoxylated with one to 100 or more moles of an alkylene oxide such as ethylene oxide, 1,2-propylene oxide and 1,2-butylene oxide or mixture thereof and then sulfated. Alkylene oxides containing from 5 to 22 carbon atoms (i.e. when $R_1$ in the above general formula may be an alkyl of from 5 to 22 carbon atoms) which are obtained by the epoxidation of straight or branched chained alpha-olefins by a peracid directly or by a chlorohydrin and caustic route may also be used. The epoxides may be derived from cracked wax and may contain both an even and odd number carbon atoms in the alkyl carbon chain. The odd-numbered alkylcarbon chain may also be derived from raw material originating either from the Ziegler synthesis (ethylene) or from fatty sources.

The preparation of the alkylene oxide adduct (alkenoxylation) of the monoethylenically unsaturated alcohol is conducted in the conventional manner.

The polymerizable monomers obtained in accordance with the present invention are useful, not only as co-polymerizable surfactants for self-stabilizing latexes, but also as comonomers in the copolymerization with other polymerizable monomers in the preparation of co- or ter-polymeric films and fibers, especially as receptors for basic dyes and to build in anti-static properties.

The monoethylenically unsaturated alcohols as well as the alkenoxylated adducts of such alcohols, instead of being converted into sulfates, can be phosphorylated with 105 or 115% super phosphoric acid under conditions known to the art to yield a mixture of mono- and di-esters of phosphoric acid. The unsaturated alcohols and the alkenoxylated adducts of such alcohols can also be condensed with sodium-chloroacetate to form the corresponding glycollic acid esters. These esters as well as the mono- and di-esters of phosphoric acid are also useful as co-monomers in emulsion polymerization, or as co-monomers in the preparation of membranes or polyelectrolyte complexes and as dye accepting monomer in copolymerization with other monomers in the preparation of films and fibers.

The following examples will serve to further illustrate the invention, but are not to be construed in limitation thereof.

EXAMPLE 1

$CH_2=CH-CH_2-O-(CH_2CH_2-O)_{4.86}-SO_3NH_4$

Into a one gallon capacity autoclave equipped with agitator thermometer, pressure gage, heating and cooling jacket (or coil), there were charged 285 gms. of allyl alcohol and 8.5 gms. of a 25% solution of sodium methylate in anhydrous methanol. After purging with nitrogen, the autoclave was heated under agitation to 40°–45°C. while pulling sufficient vacuum to remove all methanol. The temperature was then raised to 75°C. and nitrogen introduced to 10 psi pressure. During a two hour period, 1105 gms. of ethylene oxide were added gradually while raising the temperature to 135°C. followed by holding one-half hour at that temperature. A small amount of unreacted ethylene oxide was removed by pulling vacuum, followed by cooling to room temperature during one hour. The reaction product was then neutralized with 85% phosphoric acid to a pH of 5.7.

The resulting allyl alcohol ethoxylate showed a hydroxyl value of 206.1; molecular weight of 272 and an iodine value of 84.8. It was free from unreacted allyl alcohol. The average composition was 4.86 moles of ethylene oxide per mole of allyl alcohol.

Into a 1000 ml. 3-necked flask equipped with thermometer agitator and electric heating mantle, there were added 200 gms. of the resulting allyl alcohol polyethoxylate, 102 gms.(1.05 moles) of sulfamic acid and 3 gms. of urea and the mixture heated in a nitrogen atmosphere to 110°-120°C. until the acid number remained constant and a sample formed a clear solution in water. To the reaction product were added 278 gms. of water and 17 gms. of 30% aqueous ammonium hydroxide solution. The solution was clear, reddish in color and had a pH of 7. It contained 32% active allyl alcohol polyethoxysulfate ammonium salt. The iodine value was found to be 84.4 indicating a retention of the original monoethylenic unsaturation.

EXAMPLE II $CH_3—CH=CH—CH_2—O—(CH_2CH_2—O)_{\overline{50.8}}SO_3NH_4$ 72 gms. of crotyl alcohol were reacted with 2.25 gms. of sodium methylate in anhydrous methanol and 2200 gms. of ethylene oxide as in Example 1. The neutralized polyethoxylate has a pH of 6.5; a hydroxyl value of 25.1 and a molecular weight of 2235. The average composition was 50.8 moles of ethylene oxide per mole of crotyl alcohol.

200 gms. of the resulting ethylene oxide adduct of crotyl alcohol were reacted, as in Example 1, with 9 gms. of sulfamic acid and 0.27 gms. of urea. The purple reaction product was dissolved in water and the non-volatiles adjusted to 30% active and the pH to 7.6. A clear reddish solution was obtained.

EXAMPLE III $CH_2=CH(CH_2)_4—O—(CH_2—CH_2—O)_{25} SO_3NH_4$

Into the same type of autoclave as employed in Example I, there were added 200 gms. (2moles) of hexenyl alcohol (hexen-1-ol-6), 15 gms. of sodium methylate dissolved in 45 gms. of anhydrous methanol nad 2260 gms. of ethylene oxide under the same reaction conditions as described in Example I. The neutralized polyethoxylate showed a pH of 6.8 and a molecular weight of 1295. The average composition was 25 moles of ethylene oxide per mole of hexen-1-ol-6.

254 gms. of the resulting product were reacted with 20 gms. of sulfamic acid and 0.5 gms. of urea as in Example I. The somewhat dark purple product was dissolved in water and the pH and non-volatile adjusted to 30% active and a pH of 7.5. A clear reddish solution was obtained.

EXAMPLE IV

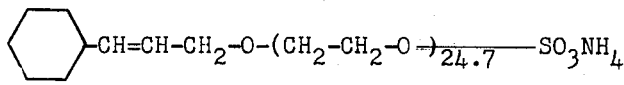

134 gms. of cinnamyl alcohol, 5 gms. of 25% solution of sodium methylate in anhydrous methanol and 1100 gms. of ethylene oxide were reacted as in Example I. The neutralized polyethoxylate showed a pH of 6.3; hydroxyl value of 45.9 and a molecular weight of 1221. The average composition was 24.7 moles of ethylene oxide per mole of cinnamyl alcohol.

200 gms. of the resulting polyethoxylated cinnamyl alcohol, 16.7 gms. of sulfamic acid and 0.5 gms. of urea were heated in a flask under a nitrogen atmosphere to 110°-120°C. until the acid number remained constant and a sample formed a clear solution in water. The reaction product was diluted with water to yield a 30% active solution and the pH adjusted to 7.3 with aqueous ammonium hydroxide solution. The latter solution was clear and of reddish color.

EXAMPLE V $CH_2=CH(CH_2)_9—O-SO_3NH_4$

One mole (170 gms) of undecenyl alcohol, 102 gms.(1.05 moles) of sulfamic acid and 3 gms. of urea were heated in a flask under a nitrogen atmosphere to 110°-120°C. until the acid number remained constant and a sample formed a clear solution in water. To the reaction product were added 278 gms. of water and 17 gms. of 30% aqueous ammonium hydroxide solution. The solution was clear, reddish in color with a pH of 7.0 and contained 33.3% active undecenyl alcohol sulfate ammonium salt. The iodine value of the active material was found to be 62.3 thus indicating retention of the original unsaturation.

EXAMPLE VI $CH_2=CH(CH_2)_9—O—(CH_2—CH_2—O)_{\overline{12.28}}SO_3Na$

Into an autoclave as in Example I there were loaded 595 gms. (3.5 moles) of undecenyl alcohol and 8 gms. of a solution of 25% sodium methylate in anhydrous methanol. The reactor was evacuated and the methanol removed by heating to 100°C. and holding it at that temperature for 20 minutes with a vacuum of about 5 mm. The reactor was then charged with nitrogen until a pressure of 10 psi was obtained and then 1840 gms. (42 moles) of ehtylene oxide were added during 1½ hours while gradually increasing the temperature to 170°C. After completion of this cycle, the batch was held for another 30 minutes at 170°C. The unreacted ethylene oxide was then removed by pulling vacuum while cooling to room temperature during one hour. The reaction product as neutralized with 2.8 gms. of 85% lactic acid and showed a hydroxyl value of 78.5, indicating a 12.28 mole ethoxylate. The molecular weight of the product was 714.7.

268.3 gms. of the neutralized reaction product were added into a three-neck flask equipped with an agitator and 52.5 gms. of chlorosulfonic acid added drop-wise during one hour at 30°-35°C., while cooling the flask in an ice bath as needed and the liberated hydrogen chloride gas removed by purging with air. After completion of the addition, air purging was continued for one-half hour. The resulting sulfate ester was neutralized by pouring 272 gms. of it into a solution of 575 gms. of water and 36.3 gms. of 50% sodium hydroxide. The final product was adjusted by the addition of 3 gms. of sodium bicarbonate to a pH of 8.8. The non-volatile content of the solution was 32.2% consisting primarily of 31.1% of the sodium sulfate of the polyethoxylated alcohol, 0.54% of unreacted nonionic, i.e. polyethoxylated undecenyl alcohol, 0.28% of sodium sulfate and 0.28% of sodium chloride. The solution was straw colored.

EXAMPLE VII 250 parts by weight of water, 95 parts by weight of vinyl chloride and 15 parts by weight of the final product of Example V (containing five parts by weight of active non-volatiles) were charged into an autoclave as employed in Example I, and the charge heated to 50°–55°C. for 20 hours under agitation. After cooling to room temperature, the autoclave was vented to release any unreacted vinyl chloride monomer. The vinyl chloride-ammonium sulfate salt of undecenyl alcohol copolymer latex obtained showed excellent mechanical stability. The composition of the copolymer was 95.6% vinyl chloride and 4.4% of the ammonium undecenyl sulfate. The yield was 92%.

EXAMPLE VIII

Example VII was repeated with the exception that the 15 parts by weight of the final product of Example V were replaced with 15.5 parts by weight of the final product of Example VI containing five parts by weight of active nonvolatiles. The stable latex showed a conversion of 98% to a copolymer with a composition of 95.2% vinyl chloride and 4.8% of the sodium sulfate of the polyethoxylated undecenyl alcohol, i.e., final product of Example VI.

EXAMPLE IX

Example VII was again repeated with the exception that the 15 parts by weight of the Final product of Example V were replaced with 16.7 parts by weight of the ammonium sulfate salt of the polyethoxylated crotyl alcohol of Example II containing five parts by weight of active non-volatiles. The stable latex showed a conversion of 84% to a copolymer with a composition of 94.4% vinyl chloride and 5.6% of the ammonium sulfate salt of the polyethoxylated crotyl alcohol.

EXAMPLE X

Into a three neck flask equipped with an agitator there were charged 425.7 gms. of water, 18.6 gms. of the sodium sulfate of the polyethoxylated undecenyl alcohol of Example VI, 210 gms. of 2-ethyl hexyl acrylate, 87 gms. of ethyl acrylate and 3 gms. of a 60% aqueous solution of N-methylol acrylamide. Agitation was initiated for a few minutes while sparging with nitrogen. The resulting uniform emulsion was heated to 60°C. and 3.6 gms. of 10% aqueous sodium persulfate added. The batch was kept at 60°–65°C. for 3½ hours. After cooling to room temperature, the emulsion contained 40.2% of tetrapolymer solids. The tetrapolymer had a pH of 7.1, a viscosity of 45 cps (Brookfield 60 rpm, Spindle No.1) and a surface tension of 57.8 dynes/cm.

EXAMPLE XI

Into a three neck flask equipped with an agitator there were added 191 gms. of water and 41.7 gms. of the ammonium sulfate salt of the polyethoxylated allyl alcohol of Example I. The solution was purged with nitrogen for 20 minutes. Sixty five gms. of vinyl acetate were added and emulsified while purging with nitrogen and agitating for five minutes. The batch was heated to 50°C. and 1 gm. of sodium bisulfite added, followed by 5 ml. of 2% aqueous sodium bisulfite solution. After a few minutes, the temperature began to rise exothermically to 55°C. An additional 185 gms. of vinyl acetate and 45 gms. of a 2% aqueous solution of sodium bisulfite were added gradually during 70 minutes, during which time the temperature was allowed to increase to 62°–65°C. After the addition was completed, the batch was heated to 75°C. and held for one hour. The batch was cooled to room temperature. The resulting latex contained 52% copolymer. The copolymer showed excellent mechanical stability in the Waring blender and was uneffected during 20 minutes of high speed blending. The latex deposited clear films on glass.

EXAMPLE XII 375 parts by weight of water, 140 parts by weight of vinyl chloride, 1.5 parts by weight of potassium persulfate and 37.5 parts by weight of the ammonium sulfate salt of the polyethoxylated cinnamyl alcohol of Example IV (containing 6 parts by weight of the active nonvolatiles) were charged into an autoclave as in Example I and heated to 55°C. for approximately 24 hours with constant agitation. After cooling to room temperature, the autoclave was vented to release any unreacted vinyl chloride monomer. The vinyl chloride-ammonium sulfate of the polyethoxylated cinnamyl alcohol copolymer latex showed excellent mechanical stability. The composition of the copolymer was 94% vinyl chloride and 6% of the ammonium sulfate salt of the polyethoxylated cinnamyl alcohol.

It is to be noted that the ammonium sulfate monomers of Examples 1 to V inclusive, after cooling to room temperature, may be converted to the corresponding alkali metal salts by the addition of the required amount of aqueous alkali metal hydroxide and then heating to about 60-75°C. to remove the ammonia and then cooling to room temperature.

EXAMPLE XIII

Into a one gallon autoclave equipped with agitator, thermometer, pressure gage, heating and cooling jacket, there were charged 100 gms. of allyl alcohol and 1 gm. of sodium methylate powder. After purging with nitrogen, the autoclave was heated under agitation to 180°C., and 1100 gms. of butylene oxide added gradually at that temperature during 6 hours. Excess, unreacted butylene oxide was removed in vacuo and the batch cooled to room temperature. The low viscosity, light straw-colored liquid analyzed to be the adduct of 6 moles butylene oxide onto 1 mole of allyl alcohol. The molecular weight was found to be 488.

200 gms. of the above adduct and 0.4 gm. of sodium methylate powder were charged into the autoclave, purged with nitrogen and heated to 180°C. 225 gms. of ethylene oxide were added during 9 hours at 180°C. After stripping off the unreacted ethylene oxide in vacuo and cooling to room temperature, a low viscosity, clear, straw-colored oil was obtained which analyzed to be the adduct of 12 moles of ethylene oxide onto the adduct of 6 moles of butylene oxide and 1 mole of allyl alcohol. 250 gms. of this adduct were mixed with 250 gms. of methylene chloride at 25°C. in a three-neck 1,000 ml. flask equipped with agitation. 35.5 gms. of chlorosulfonic acid were added during 15 minutes while cooling the flask in an ice bath. Hydrogen chloride gas was removed by purging with nitrogen for 30 minutes. the resulting batch was neutralized to a pH of 7 with 24.3 gms. of 50% aqueous sodium hydroxide while cooling the batch in cold water. The final solution was low in viscosity and straw-colored. It contained 32.7% of active surfactant, 1.5% of NaCl and 0.18% of sodium sulfate.

The resulting liquid monomer has the following formula:

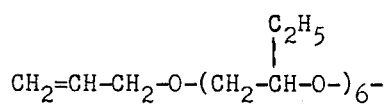

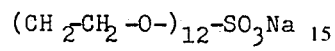

I claim:

1. A polymerizable monomer having the following general formula:

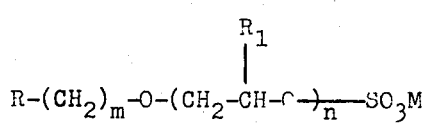

wherein R is a radical selected from the group consisting of vinyl, allyl, propenyl and isopropenyl, $R_1$ is either hydrogen, methyl or ethyl, $m$ is an integer of from 1 to 10, $n$ is a numeral ranging from zero to 100, and M is a salt forming cation selected from the class consisting of ammonium and alkali metal.

2. A polymerizable monomer, as defined in claim 1, having the following general formula:

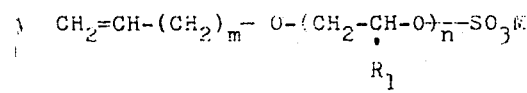

wherein $R_1$ is a member of the group consisting of hydrogen, methyl and ethyl, $m$ is an integer of from 1 to 10, $n$ is a numeral ranging from zero to 100, and M is a salt forming cation selected from the class consisting of ammonium and alkali metal.

3. A polymerizable monomer, as defined in claim 1, having the following general formula:

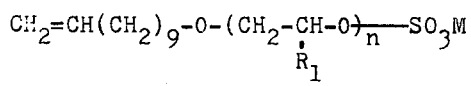

wherein $R_1$ is a member of the group consisting of hydrogen, methyl and ethyl, $n$ is a numeral ranging from zero to 100, and M is a salt forming cation selected from the class consisting of ammonium and alkali metal.

4. A polymerizable monomer having the following formula:

5. A polymerizable monomer having the following formula:

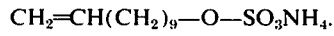

6. A polymerizable monomer having the following formula:

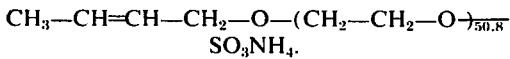

7. A polymerizable monomer having the following formula:

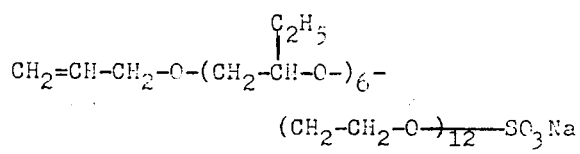

* * * * *

UNITED STATES PATENT OFFICE
CERTIFICATE OF CORRECTION

PATENT NO. : 3,875,202
DATED : April 1, 1975
INVENTOR(S) : Robert Steckler

It is certified that error appears in the above—identified patent and that said Letters Patent are hereby corrected as shown below:

Column 3, line 46, that portion of the formula reading "$(CH_2-CH_2-O\ _{25}\ SO_3NH_4)$" should read -- $(CH_2-CH_2-O)_{\overline{25}}\ SO_3NH_4$ --

Signed and Sealed this fourth Day of November 1975

[SEAL]

Attest:

RUTH C. MASON
Attesting Officer

C. MARSHALL DANN
Commissioner of Patents and Trademarks